Oct. 5, 1926.
J. W. MEADOWCROFT.
ELECTRIC WELDING MACHINE
Filed Nov. 24, 1925
1,601,871
2 Sheets-Sheet 1
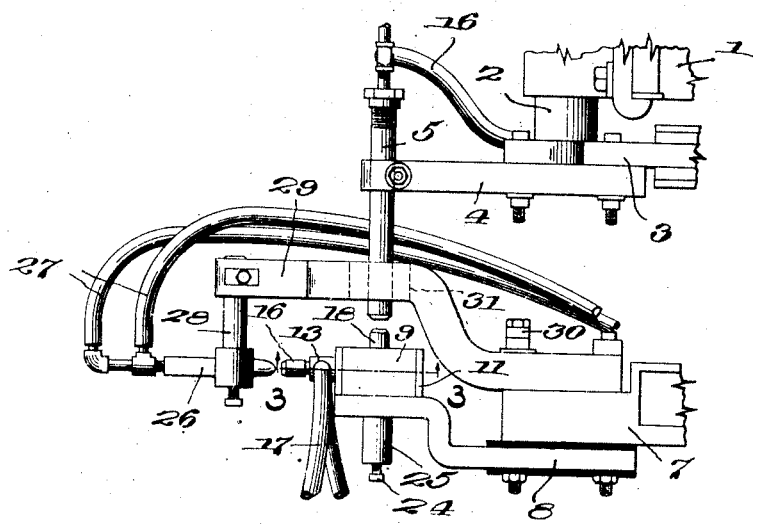
FIG.1
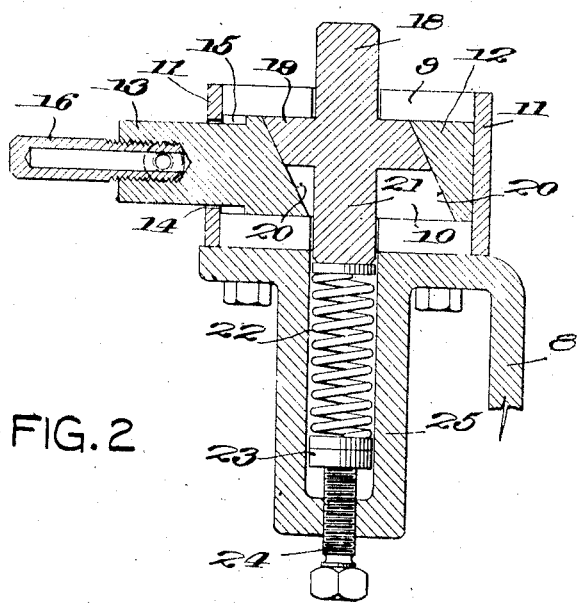
FIG.2
INVENTOR.
JOSEPH W. MEADOWCROFT
BY
ATTORNEY.

Oct. 5, 1926.

J. W. MEADOWCROFT 1,601,871

ELECTRIC WELDING MACHINE

Filed Nov. 24, 1925      2 Sheets-Sheet 2

INVENTOR.
JOSEPH W. MEADOWCROFT
BY
ATTORNEY.

Patented Oct. 5, 1926.

1,601,871

UNITED STATES PATENT OFFICE.

JOSEPH W. MEADOWCROFT, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA.

ELECTRIC WELDING MACHINE.

Application filed November 24, 1925. Serial No. 71,040.

This invention relates to electric welding apparatus, and more particularly to spot welding machines such as are commonly employed for uniting sheet metal parts.

As such machines are usually constructed, they comprise a pair of horizontally extending arms, the lower one being fixed and the upper one vertically movable. These arms carry the welding electrodes, which are arranged one below the other, in vertical axial alinement. With this type of machine, therefore, the welding takes place in a horizontal plane, the work being placed between the vertical electrodes.

Owing to the shape of the work, or for other reasons, it is often desirable to be able to weld in a plane other than horizontal, and the general object of the present invention is to devise means whereby the usual machine of the above type may be so modified as to make this possible. In other words, the invention seeks to provide an arrangement by means of which a machine of the character mentioned may be used for welding in a plane other than horizontal, without shifting or tilting the machine as a whole, and without subjecting the welding electrodes to angular thrusts.

To this end, the invention contemplates an attachment for a standard welding machine so designed as to translate the vertical movement of the reciprocating electrode into movement in a direction at an angle to the vertical, and to provide an auxiliary support for the fixed electrode, so that the two electrodes may be in axial alinement. In the preferred embodiment, the attachment is so constructed as to produce movement of the reciprocating electrode in a horizontal plane.

In order that the invention may be readily understood, reference is had to the accompanying drawings, in which:—

Fig. 1 is a fragmentary side elevation showing parts of a standard welding machine with my improved attachment in position thereon;

Fig. 2 is an enlarged vertical section through the auxiliary electrode and operating means therefor;

Figures 3, 4:
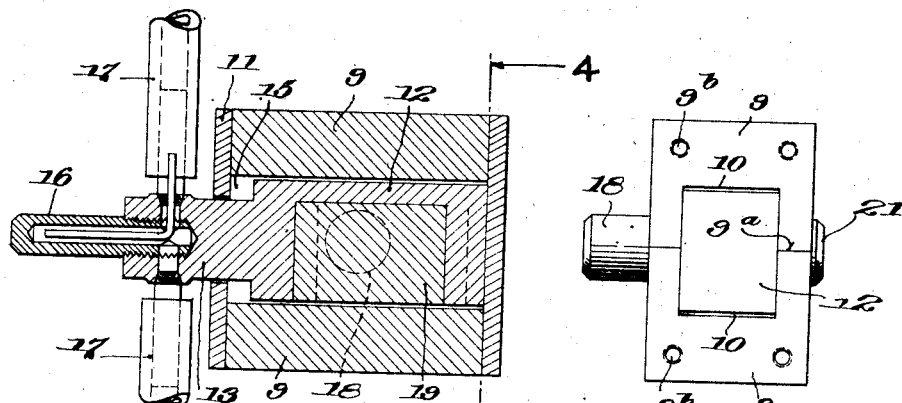
Fig. 3 is an enlarged horizontal section substantially on the line 3—3 of Fig. 1.
Fig. 4 is a section on the line 4—4 of Fig. 3, looking in the direction of the arrow.

Referring to the drawings in detail, 1 designates the frame of the machine, in which slides the usual column or pedestal 2 carrying a movable arm 3. To this movable arm an electrode holder 4 is secured, in the end of which is held the usual vertically extending electrode 5, water cooled by means of pipes 6.

7 designates the lower or fixed arm of the welding machine, and it will be understood that the current leads are connected respectively with the upper removable and lower fixed arms in the usual manner.

Bolted securely to the underside of the fixed arm 7, but insulated therefrom is a special bracket 8 forming part of my improved attachment. Supported in a horizontal position on the upper end of this bracket is an auxiliary electrode and operating means therefor. This operating means comprises a pair of complemental slotted blocks 9 fitted together along a median line, as indicated at 9ª in Fig. 4 and provided in their adjacent faces with grooves 10. The blocks are held together by means of a pair of end plates 11 secured to the blocks by means of screws or bolts (not shown) engaging in holes 9ᵇ formed in the blocks (see Fig. 4).

The grooves 10 together provide a guide or runway for a movable block or head 12, provided with a shank 13 projecting freely through an opening 14 in one of the plates 11. The block or head 12 is shorter than the length of the blocks 9 or, in other words, shorter than the grooves 10, so that a space or clearance 15 is provided between the end of the block 12 and the end plates.

An auxiliary electrode is set into the end of the shank 13 and, as shown, projects in a horizontal direction. This electrode is preferably hollow and is water cooled by means of the hose connections 17, as shown in Figs. 1 and 3.

Mounted centrally of the blocks 9 and vertically disposed in a position directly under and in axial alinement with the electrode 5 is a plunger 18. This plunger is provided at a point inside of the grooves 10 with a plate or flange 19 having beveled parallel end faces. This plate or flange works within a slot formed in the block 12, the end walls 20 of this slot being inclined at the same angle as the end walls of the plate or flange 19 so that the one is complemental to the other. It will therefore be clear that the plate or flange 19 with its beveled ends, and the slot with its similarly inclined walls, constitute cooperating cam surfaces which serve to impart a horizontal movement to the block 12 and electrode 16 when the plunger 18 is depressed.

Below the plate or flange 19 the plunger 18 is extended to form a guide or tail piece 21 which works through an opening in the blocks 9 and is supported upon a helical spring 22 contained in a housing 25 secured to or forming part of the bracket 8. The lower end of the spring 22 rests upon a disk carried by a set screw 24, so that by adjusting this screw, the tension of the spring may be varied as desired.

Disposed in axial alinement with the auxiliary movable electrode 16 is an auxiliary fixed electrode 26, also preferably water cooled as by means of hose connections 27. The electrode 26 is clamped in a post 28 held in the outer end of a bracket 29 secured to the fixed arm 7 of the machine as by means of bolts 30. This bracket is provided with a slot 31 through which the electrode 5 extends, the slot being of such shape and size as to entirely clear the electrode. That is to say, the electrode 5 and bracket 29 are entirely out of contact.

In practice, all of the parts 9 to 21, inclusive, are formed of material having a high electrical conductivity, such as copper, so that these parts may serve to convey the welding current.

The operation of my improved attachment will be apparent. As the vertical movable electrode 5 is lowered in the usual manner, it will engage and depress the plunger 18, thus shifting the block 12 to the left and forcing the electrode 16 toward the fixed electrode 26, the work, of course, being positioned between these electrodes in a substantially vertical plane. Current is supplied from one side of the circuit through the fixed arm 7, bracket 29, and post 28 to the electrode 26, and from the other side of the circuit through the movable arm 3, electrode 5, plunger 18, and block 12 to the electrode 16. Thus, the operating mechanism, itself, serves as a conductor to convey the welding current to the auxiliary electrode.

Figure 5:
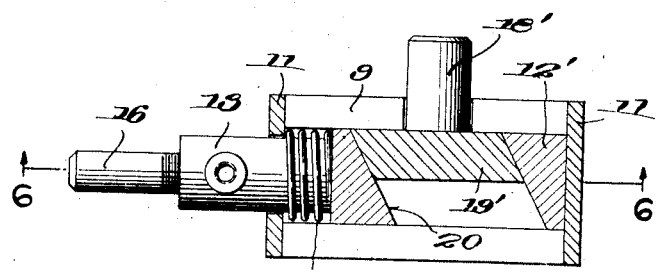
Fig. 5 is a view similar to Fig. 2, but showing a modified arrangement.
Figure 6:
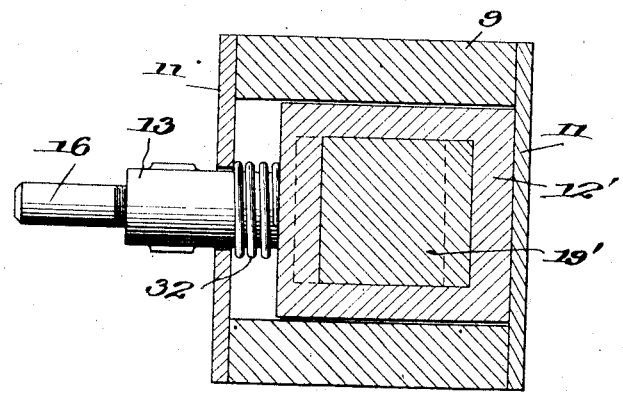
Fig. 6 is a horizontal section on the line 6—6 of Fig. 5, parts being in elevation.

In Figs. 5 and 6 I have illustrated a slightly modified construction. In this construction the plunger 18' carries the cam flange 19' which works in the cam slot 20 of the block 12' in a manner generally similar to that described in connection with the arrangement already discussed, the shape of the parts, however, showing a slight variation.

The essential difference between the two modifications resides in the fact that instead of supporting the plunger 18 on a spring, as shown in Fig. 2, I provide a spring 32 encircling the shank 13 and disposed between the block 12' and the end plate 11. The operation is essentially the same in both cases, in that the spring serves to retract the electrode 16 and restore the plunger 18 to its original position after these parts have been moved by engagement of the electrode 5 with the plunger.

While I have shown and described the auxiliary electrodes 16 and 26 as being disposed in a horizontal plane so that the welding plane is vertical, it is obvious that they may be equally well set at any other desired angle, since all that is necessary is to cut the cam surfaces 19 and 20 in a corresponding manner, and, of course, form the grooves 10 accordingly.

It will be particularly noted that the thrust for operating my improved auxiliary electrode is applied axially of the electrode 5, or, in other words, in the direction in which said electrode is designed to stand the strain, and that no lateral or transverse stresses are developed in the electrode 5. This is due to the fact that the element 18 of the auxiliary electrode operating mechanism partakes of only a true rectilinear movement.

It will thus be seen that I have provided an attachment which can be readily applied to the usual existing types of welding machines, and that such attachment can be designed to weld in any desired plane. It is therefore thought that the many advantages of the invention will be readily appreciated by those skilled in the art without further discussion.

What I claim is:—

1. The combination with a welding machine having the usual vertical movable electrode, of an auxiliary electrode mounted to reciprocate at an angle thereto, means operated by said vertically movable electrode for moving said auxiliary electrode, and a fixed electrode cooperating with said auxiliary electrode.

2. The combination with a welding machine having the usual vertically movable electrode, of an auxiliary electrode mounted to reciprocate at an angle thereto, means shiftable in the direction of movement of and operated by said vertically movable electrode for moving said auxiliary electrode, and a fixed electrode cooperating with said auxiliary electrode.

3. The combination with a welding machine having the usual vertically movable electrode, of an auxiliary electrode mounted to reciprocate at an angle thereto, means including a plunger mounted in axial alinement with said vertically movable electrode and operated thereby for moving said auxiliary electrode, and a fixed electrode cooperating with said auxiliary electrode.

4. The combination with a welding machine having the usual vertically movable electrode, of an auxiliary electrode disposed at an angle thereto, a plunger mounted for reciprocation in axial alinement with said vertically movable electrode, and a holder for said auxiliary electrode, said plunger and holder having cooperating cam surfaces whereby the shifting of said plunger serves to move said holder and auxiliary electrode.

5. The combination with a welding machine having the usual vertically movable electrode, of an auxiliary electrode mounted to reciprocate at an angle thereto, and means for moving said auxiliary electrode, said means including an element having a purely rectilinear movement and arranged to be engaged and shifted by said vertically movable electrode.

6. The combination with a welding machine having the usual vertically movable electrode, of an auxiliary electrode mounted to reciprocate at an angle thereto, and means arranged to be engaged and operated by said vertically movable electrode for moving said auxiliary electrode, said means being constructed to conduct the welding current directly from said vertically movable electrode to said auxiliary electrode.

7. The combination with a welding machine having the usual vertically movable electrode, of an auxiliary electrode mounted for movement at an angle thereto, a fixed electrode, means operated by said vertically movable electrode for moving said auxiliary electrode toward said fixed electrode, and a spring for moving it in the opposite direction.

8. An attachment for welding machines having a fixed arm and vertically movable electrode, said attachment comprising an auxiliary electrode and operating means therefor, and means for supporting said parts on the fixed arm of the machine in such position that a portion of said operating means lies in the path of travel of said vertically movable electrode, so as to be engaged and actuated thereby.

9. An attachment for welding machines having a fixed arm and vertically movable electrode, said attachment comprising an auxiliary electrode and operating means therefor, and means for supporting said parts on the fixed arm of the machine with the auxiliary electrode horizontal and a portion of the operating means in a position to be engaged and actuated by said vertically movable electrode.

10. An attachment for welding machines having a fixed arm and vertically movable electrode, said attachment comprising an auxiliary fixed and an auxiliary movable electrode, and operating mechanism for the latter, and means for supporting said parts on the fixed arm of the machine with said auxiliary electrodes in alinement and at an angle to the vertical, and with a portion of said operating mechanism in a position to be engaged and actuated by said vertically movable electrode.

In testimony whereof I hereunto affix my signature.

JOSEPH W. MEADOWCROFT.